(No Model.)
H. ORCHARD.
HAY DRAG.
No. 343,601. Patented June 15, 1886.
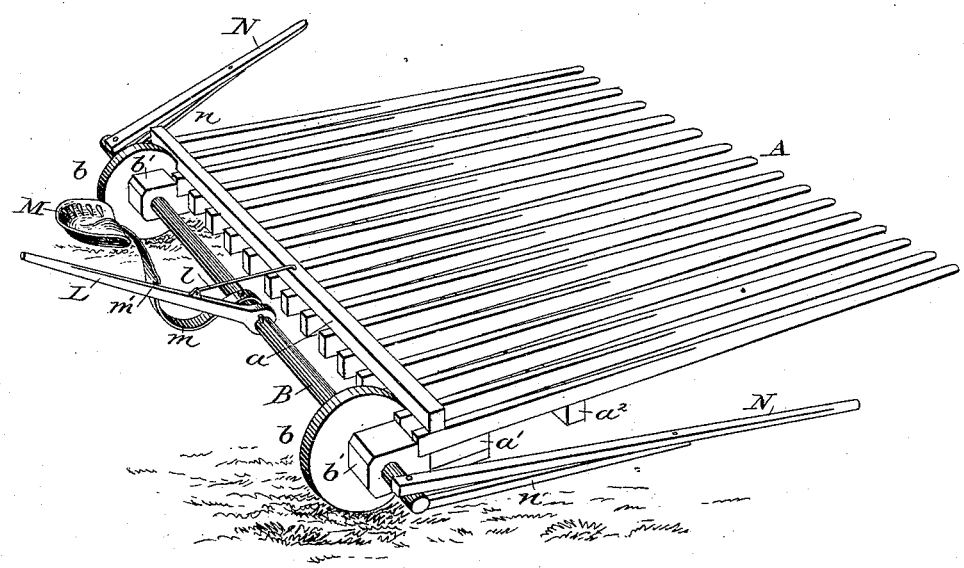
Witnesses:
H. W. Wells.
A. Keithley
Inventor:
Henry Orchard,
by A. B. Upham.
N. PETERS. Photo-Lithographer, Washington, D. C.

UNITED STATES PATENT OFFICE.

HENRY ORCHARD, OF PEORIA, ILLINOIS, ASSIGNOR OF ONE-HALF TO A. V. VENELL, OF SAME PLACE.

HAY-DRAG.

SPECIFICATION forming part of Letters Patent No. 343,601, dated June 15, 1886.

Application filed May 9, 1885. Serial No. 164,976. (No model.)

*To all whom it may concern:*

Be it known that I, HENRY ORCHARD, of Peoria, in the county of Peoria, in the State of Illinois, have invented an Improved Hay-Drag; and I do hereby declare that the following is a full, clear, and exact description thereof, reference being had to the annexed drawing, making a part of this specification, in which like letters of reference refer to like parts, and in which the figure represents a perspective view of the invention.

This invention is in the line of hay-rakes, usually termed "hay-drags," designed for collecting the hay from the field and bringing it to the stacker, by which the load is removed and piled in heaps or stacks.

Hay-drags of the kind herein shown consist, usually, of a series of rake-teeth secured at their posterior extremities to a frame supported by two wheels, and adapted to have their forward ends rest upon the ground, two tongues being provided for attachment to the horses, each tongue pivotally secured to a side of the drag.

The improvement which I have designed consists in means whereby, when the rake-teeth have gathered their load of hay, the forward ends of the teeth can be raised a short distance above the ground and held in such position while being moved along the ground to the stacker. To achieve this object I have constructed the following:

The hay-drag itself consists of the teeth A, rigidly fastened at their rear ends to the cross-beams $a$ $a'$ $a^2$. From the cross-beam $a'$ project bearings $b'$, through which passes the shaft B. Wheels $b$, mounted on said shaft, support the rear portion of the teeth A. Tongues N N are secured to the projecting ends of said shaft by vertical pivots in such a way that said tongues can turn horizontally from front to rear, but when lifted move said shaft with them. The shaft B is strengthened in its pivotal coupling to the tongues N by means of the braces $n$, each bolted at its front end to a tongue, and at its other end to the under side of the end of the shaft B below the point where its respective tongue is pivoted. The wheels $b$ are loosely mounted on the shaft B, and said shaft is also loosely held in the bearings $b'$. Rigidly projecting from this shaft B is the supporting-arm of the seat M. The lever L, pivotally secured at one end to the shaft B, has a link, $l$, joining it to the cross-beam $a$ or $a'$. The supporting-arm $m$ is provided with a lug, $m'$, adapted to hold the lever L at a backward angle of inclination. The driver, being in the seat M, can by resting more or less weight upon the lever L, raise the forward end of the rake-teeth A, the link $l$ communicating the pull of said lever to said teeth and their frame-work. Then catching the lever L under the lug $m'$ the former is prevented from returning and the teeth from dropping, the supporting-arm $m$ and the shaft B, rigid therewith, being kept from turning by means of the tongues N, held by the horses. The weight of the hay upon the teeth is now transferred to the support of the horses, the front ends of said teeth are held up from contact with the ground, and the whole can now travel over the field without danger of the front ends of said teeth catching in the inequalities thereof and causing the destruction of the rake.

I am aware that hay-drags have been constructed somewhat similar to this above described; but there have never been any, so far as I am informed, made with such a tip-raising device.

What I claim as my invention, and for which I desire Letters Patent, is as follows, to wit:

1. In a hay-drag, the combination, with the drag, of the shaft B, loosely held in bearings connected to the drag, supporting-wheels mounted on said shaft, tongues connected to said shaft, as set forth, a lever loose on said shaft, a link joining said lever to the rake-frame, and means for locking said shaft and lever rigidly together, substantially as and for the purpose specified.

2. The combination, with the rake, of the shaft B, loosely held in bearings projecting from the rake-frame, supporting-wheels $b$, turning on said shaft, tongues N, connected to said shaft, as set forth, the lever L, loose on said shaft, the link $l$, joining said lever to the rake-frame, and the seat-support $m$, rigidly projecting from said shaft and provided with one or more lugs, $m'$, for holding said lever, as set forth, for the purpose specified.

In testimony that I claim the foregoing invention I have hereunto set my hand this 14th day of January, 1885.

HENRY ORCHARD.

Witnesses:
A. B. UPHAM,
A. KEITHLEY.